Oct. 19, 1948.    C. D. RYDER    2,451,875
TRAFFIC SIGNALING DEVICE
Filed Oct. 17, 1945
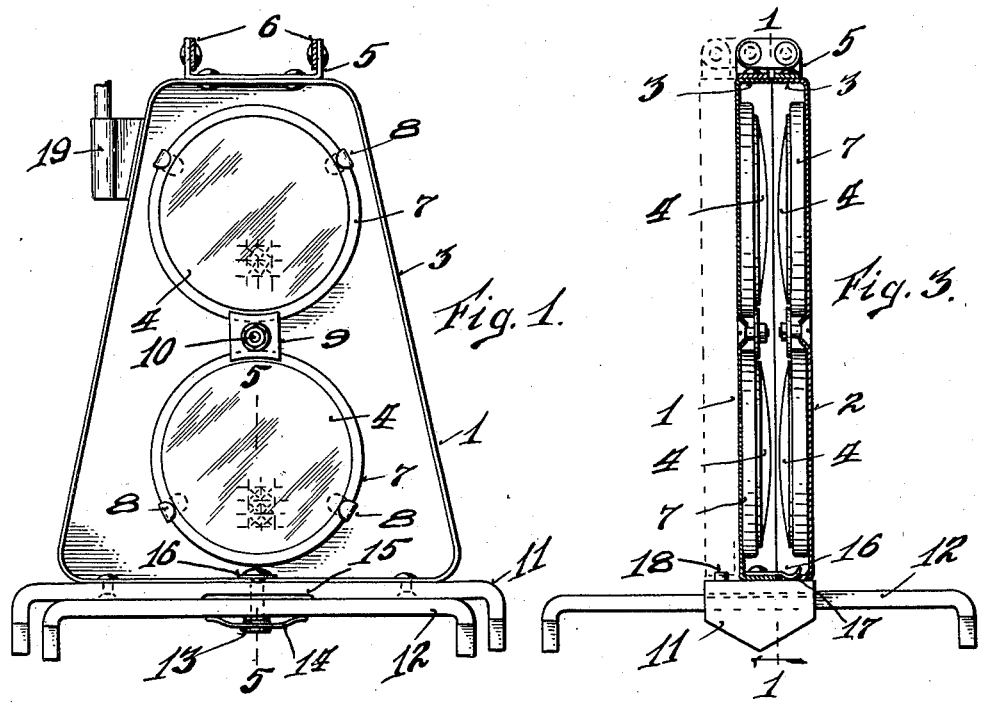
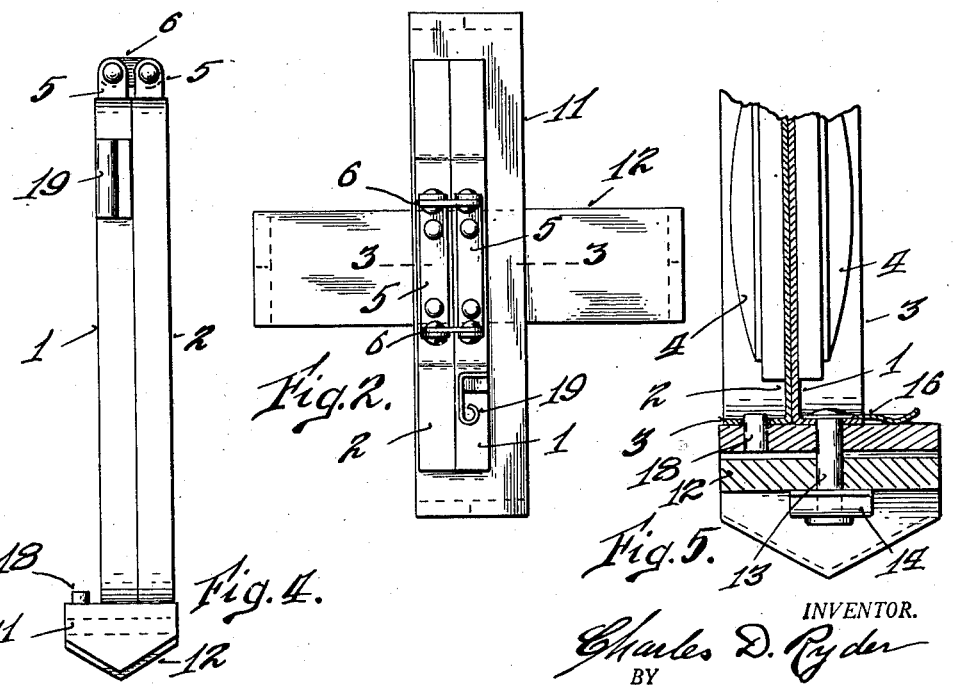
INVENTOR.
Charles D. Ryder
BY
Oliver B. Kaiser
atty.

Patented Oct. 19, 1948

2,451,875

UNITED STATES PATENT OFFICE 2,451,875

TRAFFIC SIGNALING DEVICE

Charles D. Ryder, Covington, Ky., assignor to The Grote Manufacturing Company, Bellevue, Ky., a corporation of Kentucky Application October 17, 1945, Serial No. 622,840

5 Claims. (Cl. 248—33)

1

This invention relates to a highway traffic signalling device, and particularly to a portable signal, adapted to be temporarily stationed on a highway, thoroughfare and the like, in proximity to an obstruction thereon, as a warning to approaching vehicular traffic of the existence of the obstruction.

In some instances, it is necessary to park a motor vehicle, as a truck upon the highway, particularly where the sides along the highway are not load bearing nor offer sufficient space to permit the vehicle to be moved clear of the road as when the vehicle, because of tire or wheel trouble, cannot be conveniently moved, whereupon it becomes an obstruction or hazard to other vehicular travel, thereby necessitating the display of signal or warning to approaching vehicles for safety and precautionary measures.

It is an object of the invention to provide an efficient and portable signal device, adapted to be stationed upon the highway and capable of reflecting or refracting light rays generated from the head lights of approaching vehicles from either of opposite directions back to the source, to warn the occupants of those vehicles of the presence of an obstruction upon the roadway.

Another object is to provide a light reflecting signal device embodying a pair of sheet metal panels in fold arrangement and hingedly connected together at one end and as a unit equipped with means for sustaining the same in perpendicular position, each having light reflecting elements of lens or disk form mounted on one side thereof, the hinged connection of the panels, providing for swinging one about the other for encasing or alternately to position the same as a unit for exposure of the reflector elements respectively from opposite sides thereof.

Various other features and advantages of the invention will be more fully set forth in the following description of the drawings accompanied herewith, depicting a preferred embodiment and forming a part thereof, in which:

Figure 1 is a section on line 1—1, Figure 3, illustrating the panel supporting claw bars in plane with the panel to which they connect, for nested knock-down position, diverted from their active crosswise panel sustaining position, as shown in Figure 2.

Figure 2 is a top plan view of the device in its erected position.

Figure 3 is a section on line 3—3, Figure 2, with the supporting bars in elevation.

Figure 4 is an end elevation of the device in its closed or portable position.

2

Figure 5 is an enlarged section, taken on line 5—5, Figure 1, with the panels in an open position of the device for exposure of the reflector elements respectively of the panels from opposite sides as a unit.

Referring to the drawings, the invention in detail comprises a pair of sheet metal panels 1 and 2, of duplicate shape and preferably of isosceles trapezoid outline, tapering inward or converging toward one end, as the top end when in an erected or perpendicular signal display position for increased stability. Each panel is bounded or bordered by a lateral flange 3, extending laterally from one side thereof, to give rigidity thereto and pan form, to recess a face side and in a fold arrangement adapt the same when brought together with their flanges in registering abutting contact to provide a casing for enclosing and housing the reflector elements or lenses 4, mounted upon the recessed face side of the panels. The panels at their reduced width or upper end when in an erected position are connected by a hinge preferably consisting of a pair of corresponding U-shaped brackets 5, 5, each respectively fixed or riveted to the top flange of a panel, with the right angular limbs at the opposite end of the brackets, respectively relatively connected by a link 6, having its opposite ends pivotally joined to a relative limb of the brackets. This form of hinge connection permits the panels to be brought together with their flanges in registering abutting contact to provide a casing or enclosure for protecting the lenses in a closed or portable position of the device as shown in Figures 3 and 4, or alternately to change the fold by swinging the panels, one about the other to a reverse or erected position for reflector element signalling exposure respectively from opposite side of the panel as a unit.

The reflector elements are of conventional construction, preferably of a moldable plastic material, which permits of a greater sharpness of prismatic formation on one side thereof for a superior light reflecting effect, and red in color. The face side of the reflector element is of arced smooth surfaced form and the rear side of suitable prismatic design for reflecting and/or refracting light rays, as generated by the head lights of an approaching vehicle, back to the light source and visibility by the driver of the vehicle, as a warning signal of an obstruction on the highway or road.

The rear side of the reflector element is covered with a casing 7, annularly flanged over the rim of the reflector element. For adequate glare, each panel has a pair of reflector elements of a size corresponding, that in an aligned arrangement the length of the panel will suitably accommodate, centrally thereof. The number, size and arrangement of reflector elements for each panel, however is optional, and the reflector means may comprise a multiplicity of what is conventionally termed "deflector buttons," disposed in a selected design arrangement on the order of reflector road signs.

Each reflector element is securely mounted on a face side of the panel by a pair of tangs 8, 8, stamped out and bent up from the body of the panel to clasp over the rim of the casing 7, and the aligned pair of reflector elements, additionally and jointly are clamped to the panel by a clamp plate 9, having its opposite ends respectively overlappingly engaging the rims of the casings of the reflector elements and fixed to the panel by a screw headed bolt 10, traversing an aperture through the panel with the head of the bolt countersunk therein.

The panels, as a unit are sustained in their erected or perpendicular signal display position by a pair of claw bars 11, 12, relatively of different length to permit the shorter to be moved into a nested position within the other, to compactly fold the same in parallelism with the lower end of the panels. Each of the claw bars has its opposite ends bent at the right angles and pointed to prick the surface upon which it bears. The larger length bar 11, is permanently fixed to the outer side of the flange at the lower end of one of the panels and shown as riveted and the second or shorter length bar 12, is centrally pivotally mounted to the bar 11, by a bolt 13, engaged therethrough and through the flange of the panel to which they are permanently secured. The outer end of the bolt 13, carries a leaf spring 14, for compressively binding the bars. The bar 11, centrally at the pivotal connection of the bars has a recess 15, in its underside to socket the bar 12, under the pressure of the spring 14, when the bars are disposed at right angles in their panel sustaining position.

To distinguishingly identify the panels, the one carrying the claws may be designated as a stationary panel and the second as a movable hinged panel. The movable panel is locked in either of its alternate positions about the stationary panel, in a closed position of the panels by a yielding or spring clip 16, secured to the bottom flange of the stationary panel by the claw pivot bolt 13, and extends therefrom with its forward or reach end nibbed or indented for snapping into an aperture 17, in the lower flange of the movable panel to hold the panel in a closed position over the face side of the stationary panel to enclose the reflector elements. In its alternate position when disposed at the rear side of the stationary panel, in the active position of the panels for reflector element exposure, it is locked by a pin 18, protruding from the upper side of the claw 11, and engaged through the aperture 17, through the lower flange of the panel. The stationary panel is located central of the claws, or claw 11, which is of a width dimension to receive and sustain the movable panel when disposed upon either side of the stationary panel.

The claws are of a length dimension so that when disposed crosswise, with the movable claw 12, extending centrally and laterally from the panels as a unit, to amply sustain the panels in an upright position upon the ground surface which they are stationed. It is preferable to have the spread of the claws equal to or slightly exceed the standing height of the device, to withstand excessive wind pressure imposed against the broadside of the panels, and serviceable heighth need not exceed nine inches.

For daylight signalling the stationary panel has a bracket 19, fixed to and projecting from the upper end of one edge of the panel with its outer end of tubular form for the reception of the end of a flag staff.

The panels in a perpendicular posture renders the device equally efficient for both horizontal or grade roadways and thereby avoids undue angular pitching of the reflected light rays above the normal vision of the driver of the approaching car from which the light emanates, although requires an extended support for the necessary stability. The outline shape of the panels together with the claw bar form of support predominantly weight the lower end of the device which assists in its stabilization and the claw bars offer an extended and divergent reach which in their nested position are not encumbering to its portability and storage. The device is simple in construction, durable and exceedingly light in weight and requires no auxiliary casing or element to enclose the reflector elements.

Having described my invention, I claim:

1. A road traffic signaling device of the nature disclosed, comprising: a pair of panels, each having a light reflecting face side, the panels hingedly connected for swinging one about the other to alternately enclose or expose the light reflecting face sides of the panels, and a pair of claw bars, one fixed longitudinally to the lower end of one of the panels and the second of a dimension to longitudinally nest within the other and in pivotal union therewith to swing from its nested to a divergent position adapting the bars to sustain the panels as a unit, perpendicularly from the ground surface upon which the device is stationed.

2. A road traffic signaling device of the nature disclosed, comprising: a pair of sheet metal panels, each bounded by a flange extending from the face side of the panel to give the same pan form, light reflector elements, respectively mounted upon the face sides of the panels, the reflector elements for each panel abounded by the flange thereof, the panels hingedly connected to bring the panels together with their flanges in abutting registry and combine to enclose the reflector elements and alternately to swing the panels one about the other to reverse their position for reflector element exposure from opposite sides thereof as a unit, and means at the lower end of the panels to sustain the same as a unit in a perpendicular position from the ground upon which the device is stationed.

3. A road traffic signaling device of the nature disclosed, comprising: a pair of panels, each having a light reflecting face side, the panels hingedly connected for a swinging one about the other to alternately enclose or expose the light reflecting face sides of the panels, and a pair of claw bars, one fixed longitudinally to the lower end of one of the panels, the bars in pivotal union to adjust the same to a relative divergent position to sustain the panels as a unit perpendicularly from the ground surface upon which the device is stationed.

4. A road traffic signaling device of the nature disclosed, comprising: a pair of sheet metal panels of pan form to provide each with a recessed face side and in fold arrangement and hingedly connected for reversing the fold, light reflector elements respectively mounted upon the recessed face side of each panel, and claw bars for sustaining the panels as a unit in a perpendicular position from the ground surface upon which the device is stationed, and combined to be set relatively crosswise, one of said claw bars fixed to an end of one of said panels and extending broadside thereof and the second panel releasably locked thereto in either of the fold positions of said panels.

5. A road signalling device of the nature disclosed, comprising: a pair of sheet metal panels of duplicate outline and pan form to provide each with a rim bounded face side having light reflecting elements mounted upon the face side, the panels hingedly connected combining the same as a unit in juxta-posed registry to oppose the face sides for encasing the reflector elements of both thereof and alternately to swing one panel about the other to expose the reflector elements respectively from relative opposite sides of the unit and a pair of claw bars adapted to be relatively positioned to rest upon the ground and perpendicularly support the panels as a unit, one claw fixedly connected to one of the panels in plane therewith and the second pivotally mounted to adjust the same from a nested position within the other to a relatively divergent position thereby combining for perpendicularly sustaining the panels when the claws are stationed upon the ground.

CHARLES D. RYDER.

REFERENCES CITED

The following references are of record in the file of this patent:

UNITED STATES PATENTS

| Number | Name | Date |
|---|---|---|
| 1,748,034 | Blackman | Feb. 18, 1930 |
| 2,220,953 | Carver | Nov. 12, 1940 |
| 2,256,014 | Carver | Sept. 16, 1941 |